April 21, 1925.  1,534,900
C. F. BOLIN
DITCHING AND GRADING MACHINE
Filed Jan. 30, 1923  5 Sheets-Sheet 1
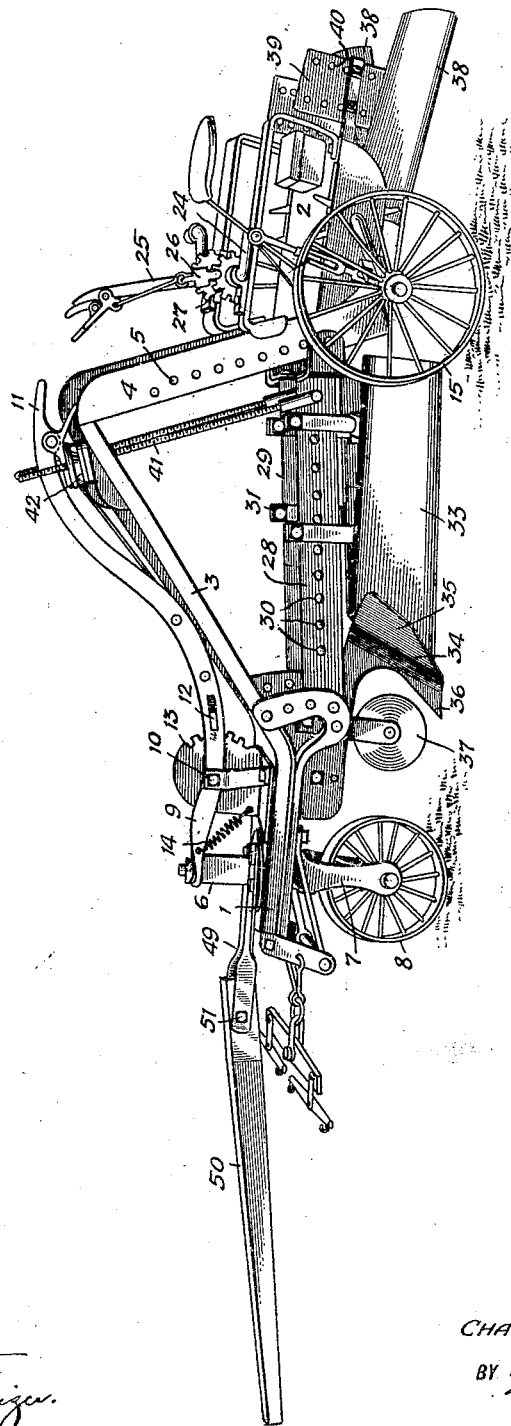
WITNESSES
Geo. W. Naylor
Robert I. Helsizer.
INVENTOR
CHARLES F. BOLIN
BY
ATTORNEYS April 21, 1925.  1,534,900
C. F. BOLIN
DITCHING AND GRADING MACHINE
Filed Jan. 30, 1923   5 Sheets-Sheet 2
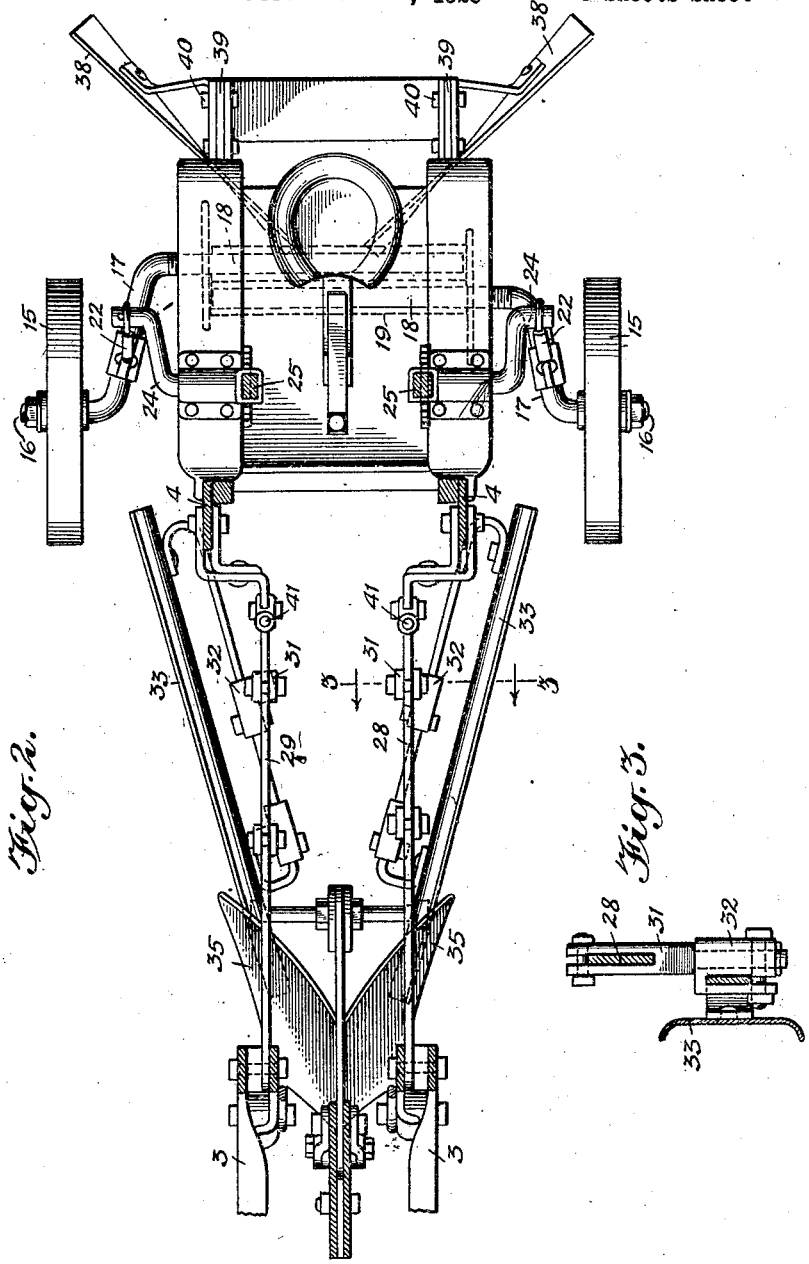
WITNESSES
INVENTOR
CHARLES F. BOLIN
BY
ATTORNEYS April 21, 1925.
C. F. BOLIN
1,534,900
DITCHING AND GRADING MACHINE
Filed Jan. 30, 1923 5 Sheets-Sheet 3
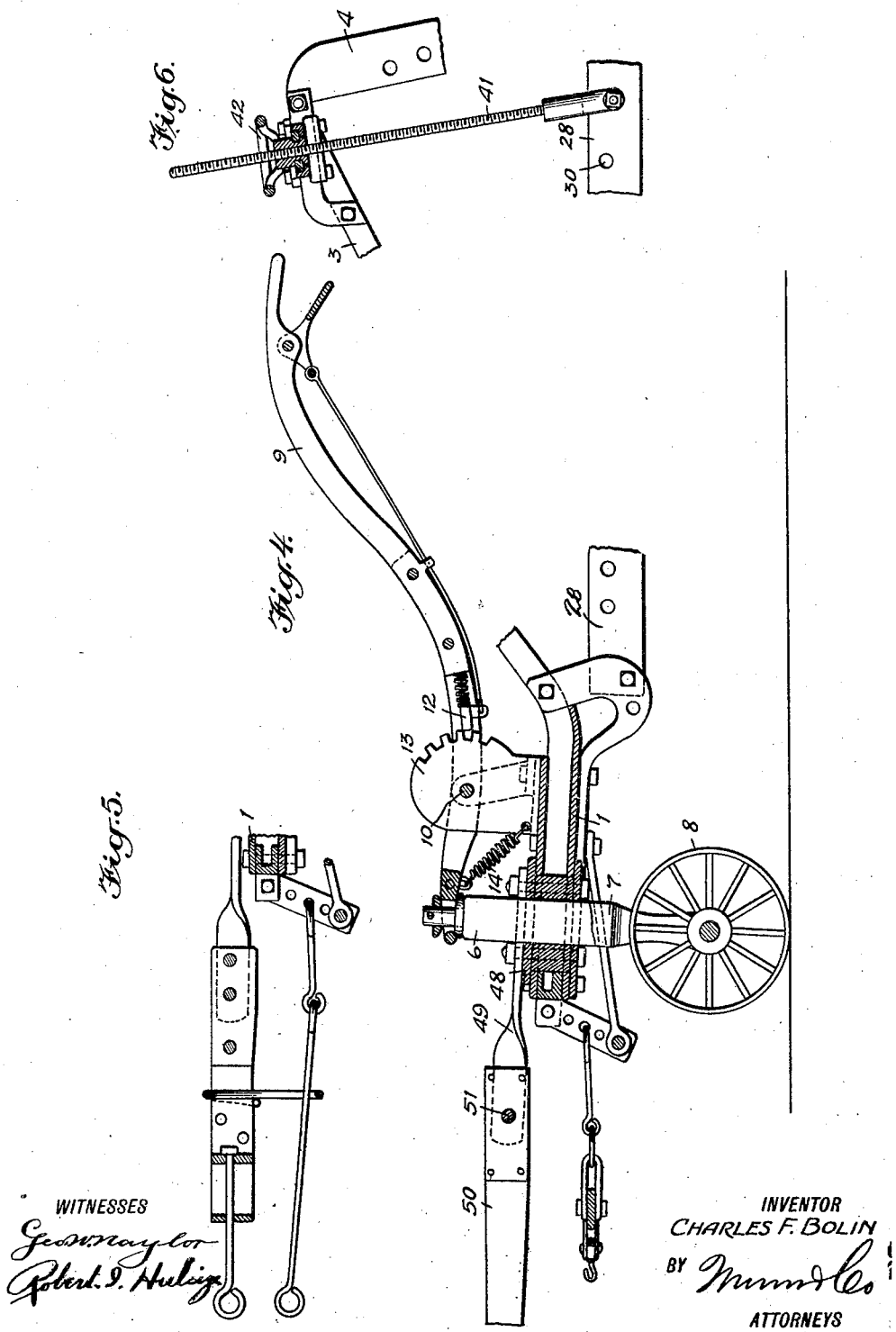
INVENTOR
CHARLES F. BOLIN
BY
ATTORNEYS April 21, 1925.
C. F. BOLIN
1,534,900
DITCHING AND GRADING MACHINE
Filed Jan. 30, 1923
5 Sheets-Sheet 4
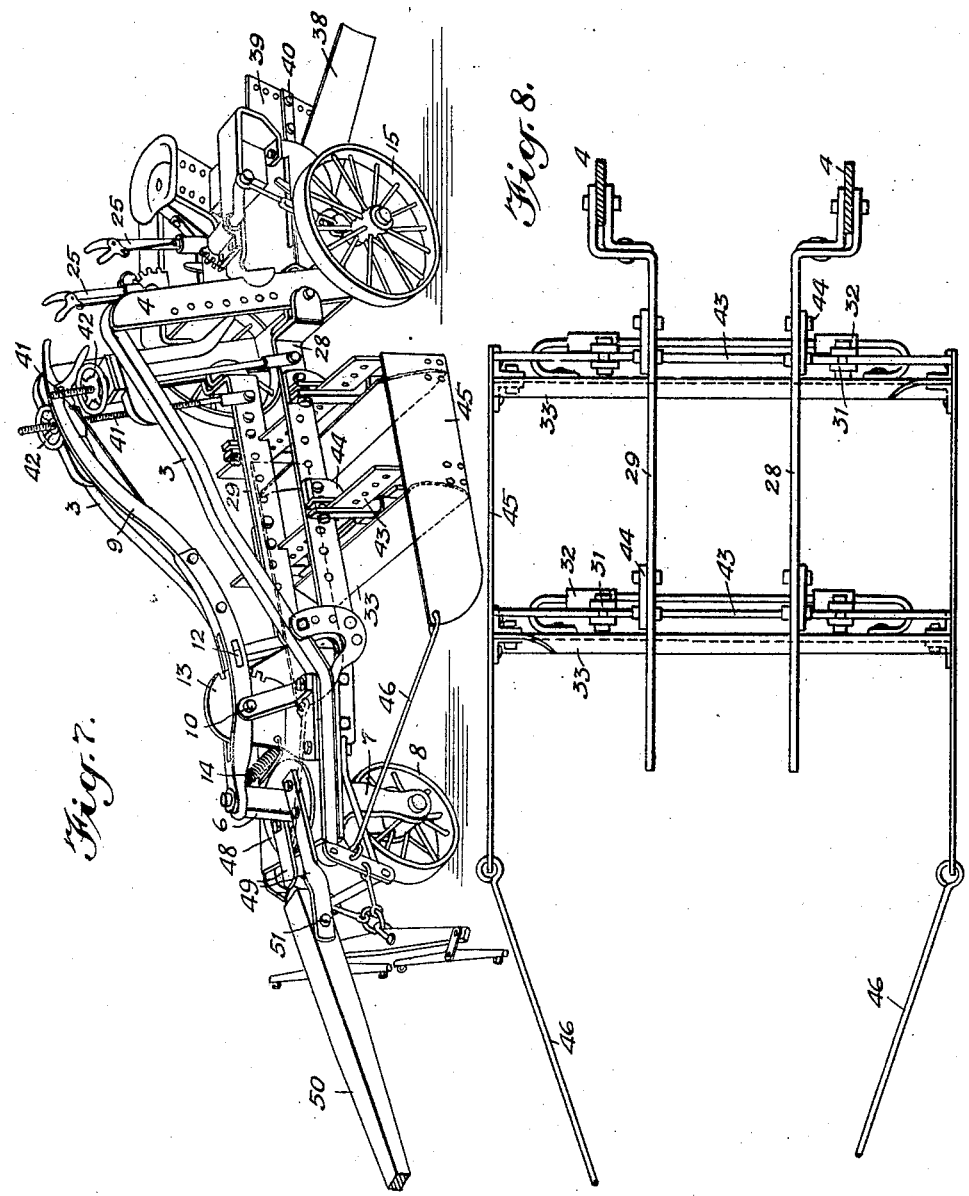
WITNESSES
INVENTOR
CHARLES F. BOLIN
BY
ATTORNEYS April 21, 1925.

C. F. BOLIN 1,534,900

DITCHING AND GRADING MACHINE

Filed Jan. 30, 1923 5 Sheets-Sheet 5

WITNESSES

INVENTOR
CHARLES F. BOLIN

BY

ATTORNEYS

Patented Apr. 21, 1925.

1,534,900

UNITED STATES PATENT OFFICE.

CHARLES F. BOLIN, OF RANCHESTER, WYOMING.

DITCHING AND GRADING MACHINE.

Application filed January 30, 1923. Serial No. 615,908.

*To all whom it may concern:*

Be it known that I, CHARLES F. BOLIN, a citizen of the United States, and a resident of Ranchester, in the county of Sheridan and State of Wyoming, have invented a new and Improved Ditching and Grading Machine, of which the following is a full, clear, and exact description.

This invention relates to a ditching and grading machine, and the main object of the invention resides in the provision of a machine for digging ditches, grading roads and doing various kinds of work of this nature, and which is exceedingly simple to operate, especially with reference to the adjustment of the parts and the flexibility with which the various operating elements can be rearranged so that the various functions above mentioned can be performed.

Another object is to provide a machine of the type described which can be operated by one man.

A further object concerns the provision of a grading machine provided with various operative elements which, by merely being rearranged on the frame of the machine and relative to each other, can perform the following functions:

1. Dig and clean ditches.
2. Fill ditches.
3. Level rough ground.
4. Dig side-hill ditches.
5. Level roads.
6. Can be used as a lister.

A careful consideration of the following specification and claims, taken in connection with the drawings, will make apparent to the reader other objects concerning the construction and operation of the details of the apparatus not herein specifically mentioned.

The invention is illustrated in the drawings, of which—

Figure 1 is a general side perspective of the device with the operative elements in position.

Fig. 2 is a plan view of the machine with the upper part of the frame cut away.

Fig. 3 is a section on the line 3—3 of Fig. 2.

Fig. 4 is a vertical longitudinal section through the front end of the machine showing the manner in which the front platform can be elevated with respect to the front wheel.

Fig. 5 is a detail section through the draft apparatus.

Fig. 6 is a detail section of the means for adjusting the supports of the ditcher wings and scraper device.

Fig. 7 is a perspective view of the machine with the parts in position for leveling rough ground.

Fig. 8 is a plan view of the scraper and co-operating elements in this position.

Figure 9:
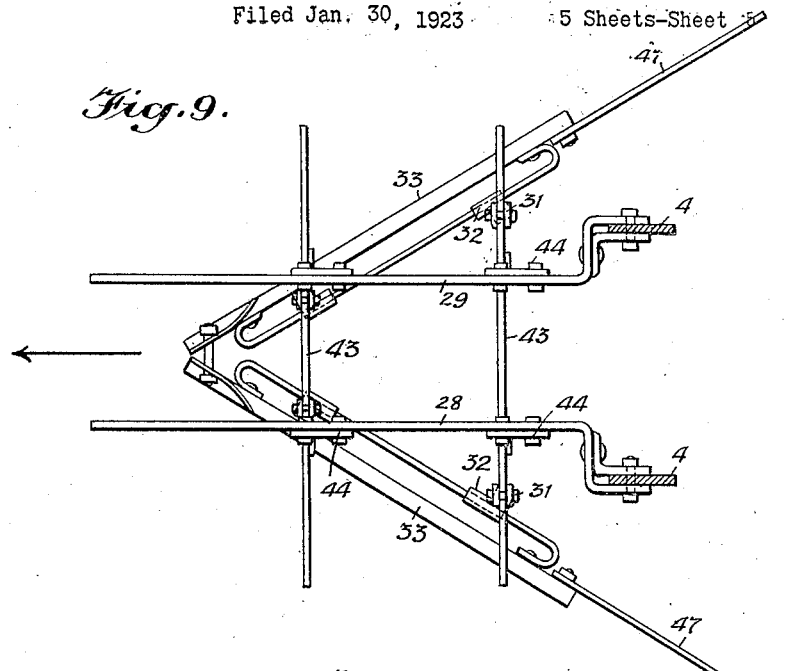
Fig. 9 is a plan view of the operative elements in position for levelling roads.

The form of the invention shown in the drawings is a preferred form, although it is understood that modifications in the construction and arrangement of the parts and in the character of the materials used may be adopted without departing from the spirit of the invention.

The invention as illustrated in the drawings in general contemplates a vehicle frame which may be made of any suitable material but as shown is made of channel members or beams having a front and a rear platform. The front platform is associated with the vertical shaft of the front wheel and extends through the platform. A lever connected to this shaft extends rearwardly and can be operated by the driver. This lever may be latched in any desired position, and by its operation the extent to which the shaft of the front wheel extends above the front platform can be regulated to determine the level of the frame of the vehicle during any particular operation.

The rear platform is the one on which the driver sits, and the rear wheels are mounted on stub shafts which are offset to provide crank arms on the outer ends of which the wheels are mounted. Links connect these crank arms with levers operated by the driver, so that the position of the stub shafts on which the wheels are mounted with respect to the rear end of the body or frame can be varied at will. This is for the purpose of permitting the wheels to ride at different levels, a position which is often necessary for the proper operation of the vehicle under various circumstances. Furthermore, the shafts on which the wheels are mounted as they pass through the frame are preferably threaded and connected to some suitable operating device so that they may be moved longitudinally inward and outward to vary the lateral distance of the wheel tread with respect to the body of the vehicle.

In the central portion of the frame, between the front and rear wheels, a plurality of supports are pivoted to the frame. These supports are provided with means whereby a plurality of scraper blades and ditching wings or blades can be supported thereon and arranged thereon in a variety of angular and relative positions to perform the various functions of a machine of this class. These supports are preferably pivoted to the front of the frame and are connected at their rear to an adjusting device, such as threaded bars, to which any suitable adjusting devices, such as threaded hand wheels, are connected so that the rear end of these supports may be raised and also to position the scraping or ditching devices mounted on these supports. The front of the frame is also provided with means for holding a plowing device, which is sometimes used in connection with the blades in front thereof to dig ditches and open up new ground.

In the form of the invention shown in Figs. 1 and 2, the body of the vehicle comprises a front platform 1 and a rear platform 2 which are connected by frame beams such as 3 and 4. The rear beam 4 is shown provided with apertures such as 5. It will be noted that these beams 3 and 4 are duplicated on each side of the vehicle from the front to the rear. Through the front platform a shaft 6 extends. This shaft is connected at its lower end with a yoke 7 on which the front wheel 8 is mounted. The upper end of this shaft is connected to the end of a lever 9 pivoted at 10 and having its opposite end 11 disposed near the driver's position on the rear platform 2. This lever is provided with a latch mechanism, such as 12, co-operating with a rack sector 13 so that the lever can be disposed in any desired position, whereby the vertical position of the shaft 6 with respect to the front platform, can be determined. A spring 14 tends to keep the front end of the lever 9 depressed.

The rear wheels, of which 15 is representative, are mounted on stub shafts 16 having an offset portion 17 and a threaded portion 18 extending through tubular members 19 mounted on the rear frame 2. Co-operating with the threaded portion of the shaft 18 is a movable sleeve 20 rotatable by means of a hand-wheel 21, and in accordance with the rotation of this hand-wheel 21 the inner end 18 of the shaft will be moved inward or outward in the tubular member 19 to determine the tread distance of the wheel 15. The other wheel on the opposite side is provided and constructed and operated in exactly the same way. The offset portion 17 of the shaft on which the rear wheels are supported is connected to a link 22 which is provided with an adjusting device, such as 23. The upper end of this link connects with a crank arm 24, and this in turn is connected to a lever 25. The lever 25 is provided with a latch mechanism 26 co-operating with a rack sector 27 to position the lever as desired. In this manner the operation of the lever 25 will dispose the crank arm 24 in a desired position and determine the elevation of its wheel 15 with respect to the frame of the machine. As shown in the drawings, moving the levers 25 forward will elevate the wheels 15, and moving them backward will depress the wheels. It will be understood that each wheel has the means for varying its lateral distance with respect to the body and its vertical distance from the body.

To the front of the frame of the machine, preferably at the rear of the front platform 1, I pivot in any desired manner a pair of supporting beams 28 and 29, preferably each on opposite sides of the machine. These beams are provided with apertures 30, and with these apertures bracket members 31 are to be associated by means of bolts and nuts, whereby the bracket members 31, of which there may be several, can be adjusted along the beam members. The lower ends of these bracket members 31, as shown particularly in Fig. 3, are provided with clamping heads 32 to engage with and support the scraper or ditching wings 33. These ditching plates or wings 33 may be disposed in a plurality of positions in accordance with the disposition of the brackets 31 on the supporting beams 28 and 29. In the position shown in Fig. 1 a plow element 34 is disposed in front of the ends of the ditcher wings. This plow element is provided with the usual shares 35 and a center cutter 36. In front of the cutter of the plow, a cutter wheel 37 may be disposed.

Connected to the rear platform are a pair of auxiliary ditcher blades or wings such as 38. These are connected to the frame by means of adjustable or perforated plates 39 which, by means of bolts and nuts 40, can be adjusted in various positions on the rear of the machine and at various angles with respect thereto. The rear ends of the supporting beams 28 and 29 lie adjacent the frame members 4, which are provided with apertures 5. Connected to the rear ends of these supporting beams are threaded adjusting rods, such as 41, of which there are two, one for each supporting beam. These rods are connected at their lower ends to these beams and co-operate at their upper ends with adjusting wheels 42 mounted on the frame and which by being rotated will move the threaded rods 41 forward and downward to determine the position of the rear ends of the supporting beams 28 and 29. These adjusting wheels can be operated by the driver from the rear platform, and it is, therefore, apparent that the driver can, by adjusting the elevation of the front and rear wheels, determine the slope or inclination of the body of the vehicle, as well as the inclination of the supporting beams on which are mounted the scraper blade or ditcher wing and various other operative elements. In other words, the driver has at his command on the rear platform means for manipulating all the elements and operative parts of the machine, making the entire operation one of extreme ease and simplicity, requiring very little labor on his part.

In the position shown in Fig. 1, the ditcher blades are arranged in V-shaped manner, with the point of the V pointing forward and with the blades arranged substantially horizontal and the plow member 34 disposed in front of the blade. In this position the blades are disposed to dig and clean flat-bottomed, wide ditches, to act as a snow plow, etc. The rear blades 38, it will be observed, are disposed at a higher lever than the front blades but are arranged in a similar V-shaped manner, and in this position are disposed to level off the sides of the ditch formed by the front blades.

The positions of the parts shown in Fig. 1 are shown in plan in Fig. 2. In Fig. 3 the details of the manner in which the scraper blades are mounted on the brackets 31 is shown.

In Fig. 7 it will be noted that the scraper blades 33 are disposed horizontally but transversely to the supporting beams 28 and 29. The brackets 31, in this case, are connected not to the supporting beams 28 and 29 directly but to cross plates 43. These cross plates are connected by brackets of their own, such as 44, to the supporting beams 28 and 29 and are perforated at intervals so that the brackets 31 supporting the ditcher plate 33 can be mounted thereon. At the ends of the ditcher plates, side wings, such as 45, are disposed longitudinally of the body and connected thereto by any suitable means. The front of these side wings is connected by links 46 to any suitable portion of the front platform so as to hold the front of the side wings rigidly. A plan view of the parts shown in Fig. 7 is shown in Fig. 8.

In Fig. 9 the positions of the parts are shown for doing snow-plow work and for digging side-hill ditches, and also for scraping roads where the dirt from the center is to be moved to the side. The only difference between the position of these blades for leveling roads and snow-plow work and that position when they are used to dig side-hill ditches or ditches with sloping bottoms, resides in the difference in the level of elevation of the rear ends of these blades. In the case of digging sloping ditches, the rear ends of the blades are elevated above the front rails, and in level roads the blades are disposed horizontally. In order to make the range of action of these blades more extensive, I can provide extension plates, such as 47, at the rear ends of these scraper blades to increase the distance over which they can scrape.

Figure 10:
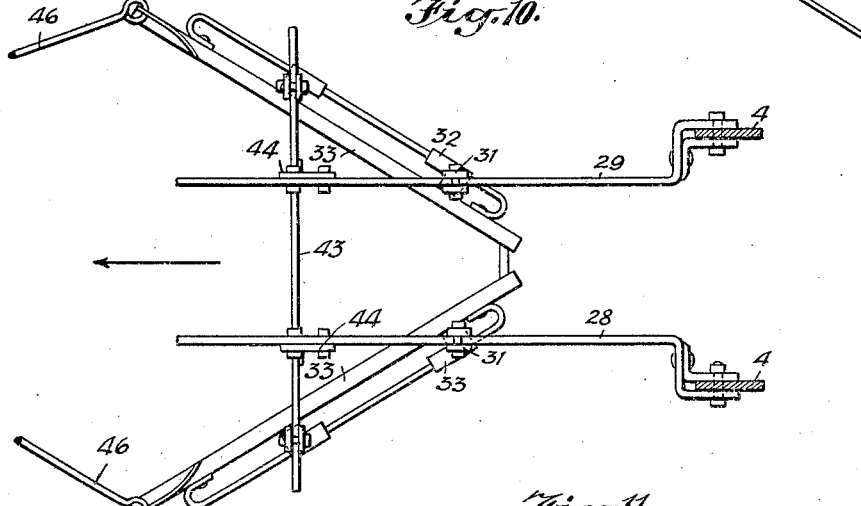
Fig. 10 is a view of the position of the same elements when used for the purpose of filling ditches and leveling roads.
Figure 11:
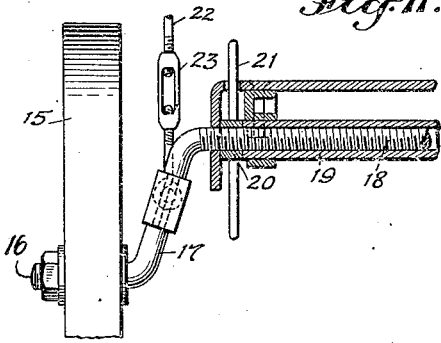
Fig. 11 is a detail section through the rear wheel support illustrating the manner in which the elevation of the rear wheels with respect to the body or frame can be varied.

In Fig. 10 the blades are shown disposed in the opposite direction but still V-shape. This position is the one in which the blades are assembled for use to fill in ditches and in leveling roads to move the dirt from the sides to the center.

The front wheel shaft, heretofore referred to by the number 6, is engaged on the upper surface of the front platform 1 by a turntable or plate 48. To this plate there is connected a pair of straps 49 which are connected in turn to the pole 50 of the wagon. The pole 50, however, is connected to these straps only by being pivoted thereto by a pin 51, so that the pole is free to move vertically but when moved laterally will very easily move the front wheel around, since this connection is a sort of swivel connection.

It will thus be seen that this device is one in which the same general combination of elements can be arranged in several combinations to perform various functions relating to ditching and grading operations; that the reassemblage and arrangements of the parts in these various positions and relations is a matter of extreme simplicity in readjustment, and that the operation of the various elements when they have been assembled in any one position can be easily effected by one operater, who need not necessarily be a skilled operator because of the simplicity of the operation.

What I claim is:—

1. A ditching and grading machine which includes a frame, a plurality of ditching and grading elements, a plurality of supports for said elements, means associated with the supports and the elements for adjusting the elements on the supports in a variety of positions, said supports being pivoted to the frame, and means connected to the free ends of the supports for adjusting the angle of the supports with respect to the frame.

2. A ditching and grading machine which includes a frame, a plurality of ditching and grading elements, movable supports for said elements connected to said frame, means for adjusting said supports, means for adjusting the elements on said supports, a front wheel, a plurality of rear wheels, means for adjusting the elevation of the front wheel with respect to the frame, and means for adjusting the elevation of the rear wheels with respect to the frame independent of each other.

3. A ditching and grading machine which includes a frame, a plurality of ditching and grading elements, movable supports for said elements connected to said frame, means for adjusting said supports, means for adjusting the elements on said supports, a front wheel, a plurality of rear wheels, means for adjusting the elevation of the front wheel with respect to the frame, means for adjusting the elevation of the rear wheels with respect to the frame independent of each other, and means for varying the tread distance between the rear wheels.

4. A ditching and grading machine, which includes a front and a rear platform supported on wheels, separate means for adjusting the wheels relative to each platform, a frame connecting said platforms, blade-supporting elements pivoted to said frame, and means for adjusting the elements with respect to the frame.

5. A ditching and grading machine, which comprises a front and a rear platform supported on wheels, a frame connecting said platforms, blade-supporting elements pivoted to said frame, means for adjusting the relation of the elements to said frame, a plurality of blades, means for adjustably supporting the blades on said elements in a variety of positions, means for adjusting the wheels with respect to the front platform, and means for separately and independently adjusting the rear wheels with respect to the rear platform.

6. A ditching and grading machine, which comprises a front and a rear platform supported on wheels, a frame connecting said platforms, blade-supporting elements pivoted to said frame, means for adjusting the relation of the elements to said frame, a plurality of blades, means for adjustably supporting the blades on said elements in a variety of positions, means for adjusting the wheels with respect to the front platform, means for separately and independently adjusting the rear wheels with respect to the rear platform, a plurality of auxiliary blades associated with the rear platform back of the rear wheels, and means for adjustably positioning said blades with respect to said platform.

CHARLES F. BOLIN.